US007416121B2

(12) United States Patent  
Zimmerman

(10) Patent No.: US 7,416,121 B2  
(45) Date of Patent: Aug. 26, 2008

(54) STAND-ALONE PROXY RFID READ/WRITE UNIT FOR PRINT LABEL ENCODING

(75) Inventor: Tim Zimmerman, Waxhaw, NC (US)

(73) Assignee: Intermec IP Corp., Woodland Hills, CA (US)

( * ) Notice: Subject to any disclaimer, the term of this patent is extended or adjusted under 35 U.S.C. 154(b) by 412 days.

(21) Appl. No.: 11/016,275

(22) Filed: Dec. 17, 2004

(65) Prior Publication Data

US 2006/0131377 A1  Jun. 22, 2006

(51) Int. Cl.
*G06F 19/00* (2006.01)

(52) U.S. Cl. .................. 235/385; 235/492; 235/375

(58) Field of Classification Search ................. 235/385, 235/492, 375, 462.01; 340/572.1, 572.4
See application file for complete search history.

(56) References Cited

U.S. PATENT DOCUMENTS

| | | | |
|---|---|---|---|
| 5,528,025 A | | 6/1996 | Swintek |
| 6,593,853 B1 * | | 7/2003 | Barrett et al. ............ 340/572.1 |
| 6,732,933 B2 | | 5/2004 | Waxelbaum |
| 6,969,134 B2 * | | 11/2005 | Hohberger et al. ............. 347/2 |
| 7,055,750 B2 * | | 6/2006 | Carrender ............... 235/472.01 |
| 7,064,668 B2 * | | 6/2006 | Porad ....................... 340/572.1 |
| 7,066,667 B2 * | | 6/2006 | Chapman et al. ............... 400/76 |
| 7,114,655 B2 * | | 10/2006 | Chapman et al. ........ 235/462.01 |
| 7,180,627 B2 * | | 2/2007 | Moylan et al. ................ 358/1.6 |
| 2004/0257203 A1 * | | 12/2004 | Maltsev et al. .............. 340/10.1 |
| 2005/0218219 A1 * | | 10/2005 | Sano et al. ................... 235/383 |
| 2006/0081713 A1 * | | 4/2006 | Carrender .............. 235/462.46 |
| 2006/0138229 A1 * | | 6/2006 | Sugiyama .................... 235/435 |

* cited by examiner

*Primary Examiner*—Ahshik Kim  
(74) *Attorney, Agent, or Firm*—O'Melveny & Myers LLP

(57) ABSTRACT

A proxy RFID read/write unit is used in conjunction with a non-RFID enabled network printer to add a capability to a local area network (LAN) to encode RFID transponders that are either embedded in print media or separate from the print media. The proxy RFID read/write unit is adapted perform the following functions: (a) detecting a message packet directed to the network printer containing a command to print a bar code label; (b) recovering information from at least one data field of the message packet; and (c) writing the information to an RFID transponder. If the network printer is adapted to print onto label media containing embedded RFID transponders, and the RFID interrogator is oriented with respect to the network printer so that a mouth of the printer is disposed within the interrogating range, the information can be written to an RFID transponder embedded in a corresponding print label of the label media.

17 Claims, 3 Drawing Sheets

STAND-ALONE PROXY RFID READ/WRITE UNIT FOR PRINT LABEL ENCODING

BACKGROUND OF THE INVENTION

1. Field of the Invention

The present invention relates generally to communication networks that include attached printers for printing of bar code labels, and more particularly, to a proxy device coupled to the network for use with a bar code label printer to enable encoding of radio frequency identification tags embedded in bar code label print stock.

2. Description of Related Art

In the automated identification and data capture industry, it is known to operate a local area network (LAN) that enables communication between a central host computer and a plurality of devices, such as printers, bar code readers, data entry terminals, and the like. The LAN may further include interconnected wired and/or wireless networks that together support communication within an enterprise. Communication cells established by wireless access points provide links between network elements connected to the wired backbone and mobile terminals. Within the LAN, operators may utilize handheld data-collection terminals to communicate with the central host computer. The data-collection terminals enable the operators to scan and decode data that may be encoded in the form of a one or two-dimensional bar code symbol. The decoded information is then transmitted back to the central host computer across the RF channel. Such wireless LAN systems are particularly well suited to data capture applications as diverse as process and inventory control, time and attendance monitoring, security management, customer service and point of sale recording, shipping and receiving record keeping, and warehouse operations.

The LAN may further include one or more printers for producing bar code labels used in identifying items that are tracked in a particular data capture application. The printers may be adapted to print individual labels on demand, or to print a series of labels in a single continuous run. In order for the data-collection terminal to accurately read the bar code symbol, it is essential that the symbol be printed in a high quality manner, without any streaking, blurring or improper registration of the symbols to the labels. At the same time, it is essential that the adhesive backing layer of the labels not be damaged by heat generated during the printing process. In view of the demanding printing requirements, bar code symbols are often printed using direct thermal or thermal transfer printing techniques, referred to collectively herein as thermal printing. To achieve maximum data throughput, dedicated thermal printers are generally coupled to the central host computer either directly or through a dedicated print server.

Increasingly, it is desirable to further equip these networks with an ability to utilize radio frequency identification (RFID) systems. An RFID tag generally includes a semiconductor memory in which information may be stored. A data collection terminal that includes an RFID interrogator is used to query an RFID tag that may be at a distance from the interrogator and moving at highway speeds. The RFID tag detects the interrogating signal and transmits a response signal containing encoded data back to the interrogator. Such RFID tags may have a memory capacity of several kilobytes or more, which is substantially greater than the maximum amount of data that may be contained in a bar code symbol or other types of human-readable indicia. Further, the RFID tag memory may be re-written with new or additional data, which would not be possible with a printed bar code symbol. RFID tags may also be readable at a distance without requiring a direct line-of-sight view by the RFID interrogator, unlike bar code symbols or other types of human-readable indicia that must be within a direct line-of-sight and which may be rendered entirely unreadable if obscured or damaged.

In view of the additional benefits of RFID tags, it is known to incorporate RFID tags into the bar code label print stock that is loaded into the network printers. Special purpose printers are adapted to print human-readable indicia and bar code symbols onto the label print stock, while at the same time an embedded RFID interrogator encodes associated data into the RFID tag memory. The printed and encoded label then serves dual purposes, i.e., it can be read by a data collection terminal having either optical scanning or RFID interrogating capability. This provides significant additional benefit for the user, and allows the user to transition from an existing bar-code based data collection capability to an RFID based data collection capability.

Notwithstanding these benefits of adding embedded RFID tags into bar code label print stock, there is a considerable cost associated with the special purpose printers and other equipment needed to implement an RFID capability. Users that have already invested significant sums in purchasing high capacity bar code label printers and associated drivers and equipment are understandably reluctant to scrap their existing systems in favor of new dual mode equipment. This has resulted in delayed adoption of RFID systems by many businesses that would otherwise benefit from RFID technology.

Accordingly, it would be desirable to provide a conventional bar code printer with an ability to encode RFID tags embedded in the bar code label print stock.

SUMMARY OF THE INVENTION

The present invention addresses the shortcomings of the prior art systems and methods. In particular, the present invention is directed to a proxy RFID read/write unit for use in a local area network (LAN) that includes a server and a network printer coupled together through a network bus. The proxy RFID read/write unit is used in conjunction with a non-RFID enabled network printer to add to the LAN a capability to encode RFID transponders that are either embedded in print media or separate from the print media.

More particularly, the proxy RFID read/write unit includes a network interface, an RFID interrogator, and a processor. The network interface is adapted to be operatively coupled to the server for receiving and sending message packets to and from the server. The RFID interrogator is adapted to read data from and write data to at least one RFID transponder disposed within an interrogating range of the RFID interrogator. The processor is operatively coupled to the network interface and the RFID interrogator, and has associated memory containing stored instructions executed by the processor. The stored instructions cause the processor to perform the following functions in association with the network interface and the RFID interrogator: (a) detecting a message packet directed to the network printer containing a command to print a bar code label; (b) recovering information from at least one data field of the message packet; and (c) writing the information to an RFID transponder. If the network printer is adapted to print onto label media containing embedded RFID transponders, and the RFID interrogator is oriented with respect to the network printer so that a mouth of the printer is disposed within the interrogating range, the information can be written to an RFID transponder embedded in a corresponding print label of the label media.

In another embodiment, the proxy RFID read/write unit may be further adapted to detect a message packet communicated on the network bus having an Ethernet address of the network printer. The proxy RFID read/write unit spoofs the network printer by capturing message packets directed to the network printer, and write the same information to the RFID transponder that is being printed onto the print label in the form of bar code symbols. The network interface may provide either a wireless or wired connection to the network bus. The proxy RFID read/write unit may additionally request additional information from the server by sending a request message packet using the sending address of the network printer. The server responds by sending a message packet containing the additional information, which can then be written by the proxy RFID read/write unit to the RFID transponder.

A more complete understanding of the proxy RFID read/write unit for print label encoding will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention satisfies the need for a proxy read/write unit to provide a conventional bar code printer with an ability to encode RFID tags embedded in the bar code label print stock. In the detailed description that follows, like element numerals are used to describe like elements illustrated in one or more figures.

Figure 1:
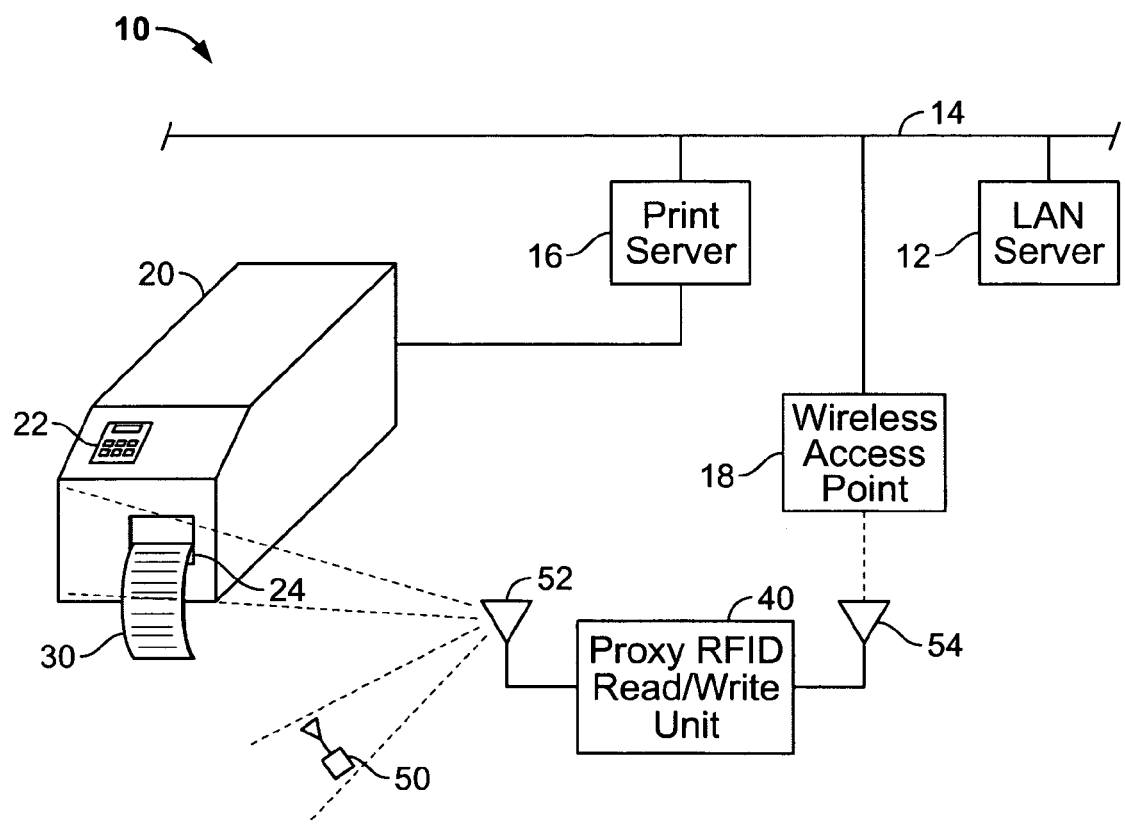
FIG. 1 is a block diagram of a local area network including a bar code label printer and proxy read/write unit in accordance with an embodiment of the invention.

Referring first to FIG. 1, a block diagram of a local area network (LAN) is illustrated, including a LAN server 12 and a print server 16 coupled via bus 14. As is well known, wired LANs, such as Ethernet, utilizing coaxial or twisted pair cabling, provide communication among remote stations, such as personal or host computers. The LAN server 12 and print server 16 each include an appropriate LAN interface (not shown), for example, Ethernet interfaces 10Base-2, 10Base-T, or 10Base-5, with a coax connector, RJ45 connector, or a DB15 connector. The LAN server 12 may serve as a library for files to be transmitted and processed on the LAN, and may further provide access to a network external from the LAN such as a wide area network (WAN), the Internet or World Wide Web, for example. It should be appreciated that a large number of additional computer resources and other devices may be coupled to the LAN.

The LAN further includes a wireless access point 18 coupled to the bus 14. The wireless access point 18 permits interconnectivity with wireless devices, such as wireless data entry terminals, pursuant to accepted standards for wireless LANs including IEEE 802.11. The LAN may further include a plurality of like access points that define the physical range of the wireless network. Communication cells established by the access points provide links between network elements connected to the wired backbone and mobile terminals. Such communications often pass through both the wireless and wired networks. Other wireless technologies, such as Bluetooth or infrared transmission (IrDA) may also be used in certain applications in which there are very short distances between devices.

The print server 16 is further coupled to at least one printer 20. As known in the art, a print server is a computer in a network that controls one or more printers. The print server may be a stand-alone a hardware device coupled between the printer 20 and the LAN, or may be a plug-in card that installs in an expansion slot of the printer 20. The print server 16 queues the print jobs and enables the printer 20 to receive print jobs from multiple sources coupled to the LAN. Accordingly, it should be appreciated that the print server 16 shown in FIG. 1 may be part of the printer 20, which is then coupled directly to the LAN. It should also be appreciated that the printer 20 and or the print server 16 may additionally, or alternatively, include a wireless connection to the LAN through an access point, such as access point 18.

The printer 20 includes an external housing with a control panel 22 that permits manual control over certain printer functions as well as status monitoring. The printer 20 includes a supply of bar code label media 30, such as wound onto a spool carried internally within the housing. The label media 30 typically includes an adhesive surface permitting the labels to be affixed to an object of interest, and a display surface formed of a suitable material, e.g., paper, to permit printing of a wide assortment of indicia thereon, including but not limited to alphanumeric data, characters, pictures, logos, bar code symbols, and other indicia. The label media 30 may further include perforation lines permitting separation of individual labels after printing. A mouth 24 disposed at a front surface of the printer 20 provides an exit port for the label media 30 after it has been printed upon. A printhead and associated feed mechanism are disposed internally of the housing adjacent the printer mouth 24.

The exemplary printer 20 includes a microprocessor or other suitable control circuitry for executing software instructions and controlling the various components of the printer, and memory such as dynamic RAM. The memory should be sufficient to store at least a portion of the instruction set for controlling the printer 20 and for providing a print data buffer for buffering print data for controlled delivery to the printhead. While the printhead will be discussed in terms of a thermal printhead, other suitable printheads include laser printheads, impact printheads, and inkjet printheads. The thermal printhead typically includes a linear array of thermal elements that may be selectively heated by the application of electric signals corresponding to the data in the print data buffer and a strobe signal from a counter or timer as is generally known in the art. The microprocessor controls the counter or timer to synchronize the strobe signal with the print data buffer. The microprocessor further controls a stepper motor and a platen roller. For each signal from the microprocessor to the stepper motor, the stepper motor advances the platen roller a given increment for advancing the label media 30 past the printhead.

The control panel 22 of the printer 20 may further include a set of printer controls allowing a user to set a number of printer parameters. The printer controls may take the form of a set of switches on the printer 20 accessible by the user. Additionally, or alternatively, the printer controls may take the form of user-selectable icons in a graphical user interface (GUI) on a visual display of the printer or on a computer coupled to the printer 20 through the LAN. The control panel 22 may also have a user input device such as a keyboard, keypad, or touch sensitive screen.

In accordance with an embodiment of the invention, a proxy RFID read/write unit 40 is wirelessly coupled to the LAN. The proxy RFID read/write unit 40 communicates with the LAN through the access point 18 via a suitable antenna. Alternatively, the proxy RFID read/write unit 40 may be directly coupled to the LAN using a "wired" connection. Through either communication path, the proxy RFID read/write unit 40 monitors (or "spoofs") data packets communicated to the printer 20. These data packets include information that would be used in the printing of bar code labels by the printer 20, such as product name, serial number, part number, supplier/customer name and address, etc. The proxy RFID read/write unit 40 then uses the same information recovered from the data packets to write corresponding information into RFID tags embedded in the label media 30.

More specifically, the proxy RFID read/write unit 40 includes an RFID interrogator that can read data from and write data to RFID tags within the range of a second, interrogating antenna. As shown in FIG. 1, the proxy RFID read/write unit 40 is oriented with respect to the printer 20 such that the mouth of the printer is located within the interrogation field of the proxy read/write unit. This enables the proxy RFID read/write unit 40 to work in conjunction with the printer 20 to write data to RFID tags embedded in the label media 30, thereby providing conventional non-RFID enabled printers with an ability to produce RFID tag-embedded bar code labels. The data written to the RFID tags may be taken from the data packets directed to the printer 20. This way, the same information printed onto the labels could be encoded into the embedded RFID tags. The proxy RFID read/write unit 40 could also receive additional information from the LAN that was not communicated to the printer 20, such as additional data fields not normally used in printing bar code labels, and this additional information could also be encoded into the embedded RFID tags. The printer 20 may be provided with suitable RF shielding to ensure that data is written only to the RFID tag embedded in the label media 30 being paid out through the mouth 24.

Additionally, or alternatively, the proxy RFID read/write unit 40 could write data to other RFID tags that are not embedded in the label media 30, such as exemplary RFID tag 50, using data that corresponds to the bar code label data recovered from the data packets. For example, some printers may not be capable of printing onto label media 30 having embedded RFID tags due to the thickness of the label media. Nevertheless, an RFID capability could still be provided to the user by writing data to a separately encoded RFID tag 50 that is used in conjunction with a bar code labels produced by the printer 20. As in the foregoing embodiment, the data written to the RFID tag 50 could be taken from the data packets directed to the printer 20, as well as additional information received from the LAN. A user would then apply both the bar code label and the RFID tag 50 to the object of interest, and the bar code label and RFID tag would each comprise corresponding data. This way, the encoded information could be read using either a bar code reader or RFID reader.

Figure 2:
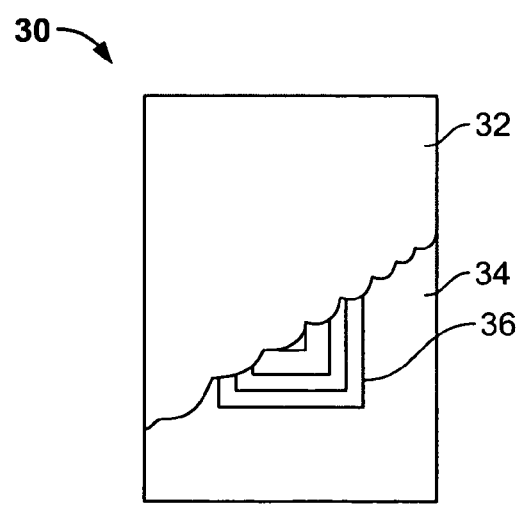
FIG. 2 is a partial sectional view of a bar code print label having an embedded RFID tag.

FIG. 2 illustrates an exemplary bar code print label 30 having an embedded RFID tag. The bar code print label 30 includes a printable face sheet layer 32 that is passable through a direct thermal printer. An RFID transponder 36 is positioned between a substrate layer 34 and the face sheet layer 32. An adhesive layer (not shown) may be provided on an opposite side of the substrate layer 34, with a removable release liner affixed to the adhesive. Alternatively, the bar code print label 30 may be provided without an attached release liner (also known as "linerless" media). The face sheet layer 32 would generally be comprised of a paper stock that presents a uniform surface suitable for printing.

The RFID transponder 36 generally includes an RF front end, a power capacitor, an analog section, a digital state machine, and a memory. The RF front end is coupled to an antenna, and may include an RF receiver that recovers analog signals that are transmitted by an RFID interrogator (e.g., proxy read/write unit 40) and an RF transmitter that sends data signals back to the RFID interrogator. The RF transmitter may further comprise a modulator adapted to backscatter modulate the impedance match with the antenna in order to transmit data signals by reflecting a continuous wave (CW) signal provided by the RFID interrogator. The antenna may comprise a dipole, a folded dipole, a meander dipole, a dipole over ground plane, a patch, and the like. The RF field provided by the RFID interrogator presents a voltage on the antenna that is rectified by the RF front end and used to charge the power capacitor. The power capacitor serves as a voltage source for the analog section, digital state machine and the memory of the RFID tag. Alternatively, instead of the power capacitor, the RFID transponder may include an active power source (e.g., battery).

Figure 3:
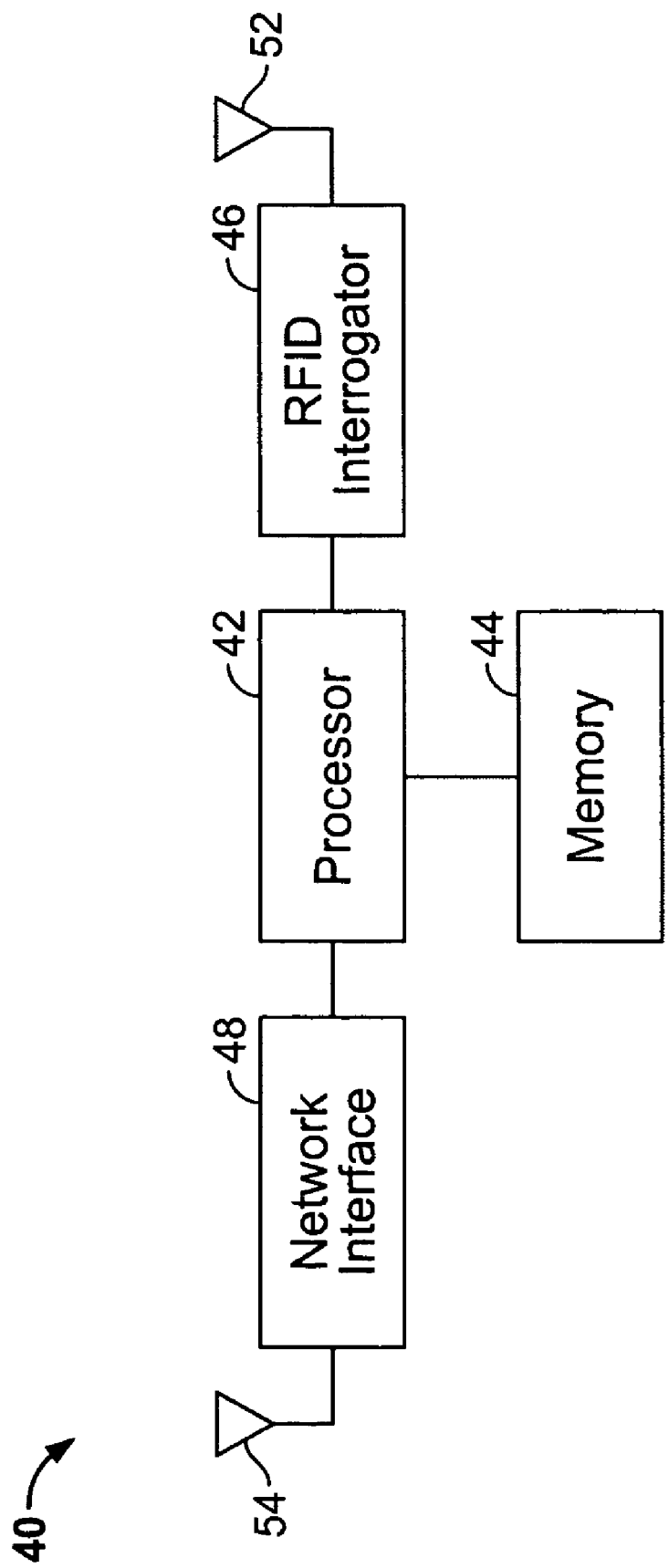
FIG. 3 is a block diagram of the proxy read/write unit of FIG. 1.

Referring now to FIG. 3, a block diagram of the proxy read/write unit 40 is provided. The proxy read/write unit 40 includes a processor 42 provided by any suitable device, such as a conventional microprocessor or microcontroller adapted to execute instructions stored on-chip. In addition to the on-chip memory capacity, an external memory 44 may be coupled to the processor 42 through a suitable bus to provide additional data processing, storage, and programming capacity. If desired, the proxy read/write unit 40 may further include a user input device (e.g., keypad) and/or visual display, though it should be appreciated that such features are not necessary to the operation of the proxy read/write unit.

The proxy read/write unit 40 communicates externally through two separate interfaces. A network interface 48 coupled to the processor 42 is used to connect the proxy read/write unit 40 to the LAN. The network interface 48 may further include a transceiver for communicating RF signals to the wireless access point 18 (discussed above) through antenna 54. The network interface 48 further includes the protocol control firmware and Ethernet Controller to support the Medium Access Control (MAC) data link protocol used by Ethernet. As known in the art, the network interface 48 is assigned an Ethernet source address that is globally unique according to a flat addressing structure. In accordance with an embodiment of the invention, the network interface 48 further includes an ability to store a second Ethernet source address corresponding to the printer 20, enabling the proxy read/write unit 40 to capture data packets directed to the printer from the LAN. While a wireless connection between the proxy read/write unit 40 is shown, it should be appreciated that a wired connection could also be provided.

The second interface to the processor 42 is provided by an RFID interrogator 46. The RFID interrogator 46 manages RF communications with the RFID transponders through antenna 52 and communicates with the processor 42. The RFID interrogator 46 produces a radio frequency electromagnetic field within an operating range in order to read information from RFID transponders within the operating range. When an RFID transponder is present in the interrogating electromagnetic field, the RFID transponder absorbs energy from the field, which allows the RFID transponder to transmit stored data to, or download data from, the RFID interrogator 46. Under a technique referred to as "backscatter modulation," the RFID transponder transmits stored data back to the interrogator 46 by reflecting varying amounts of the electromagnetic field by modifying its antenna matching impedance. The processor 42 commands the operation of the RFID interrogator 46, and communicates data to/from the RFID interrogator for communication to/from an RFID transponder.

Figure 4:
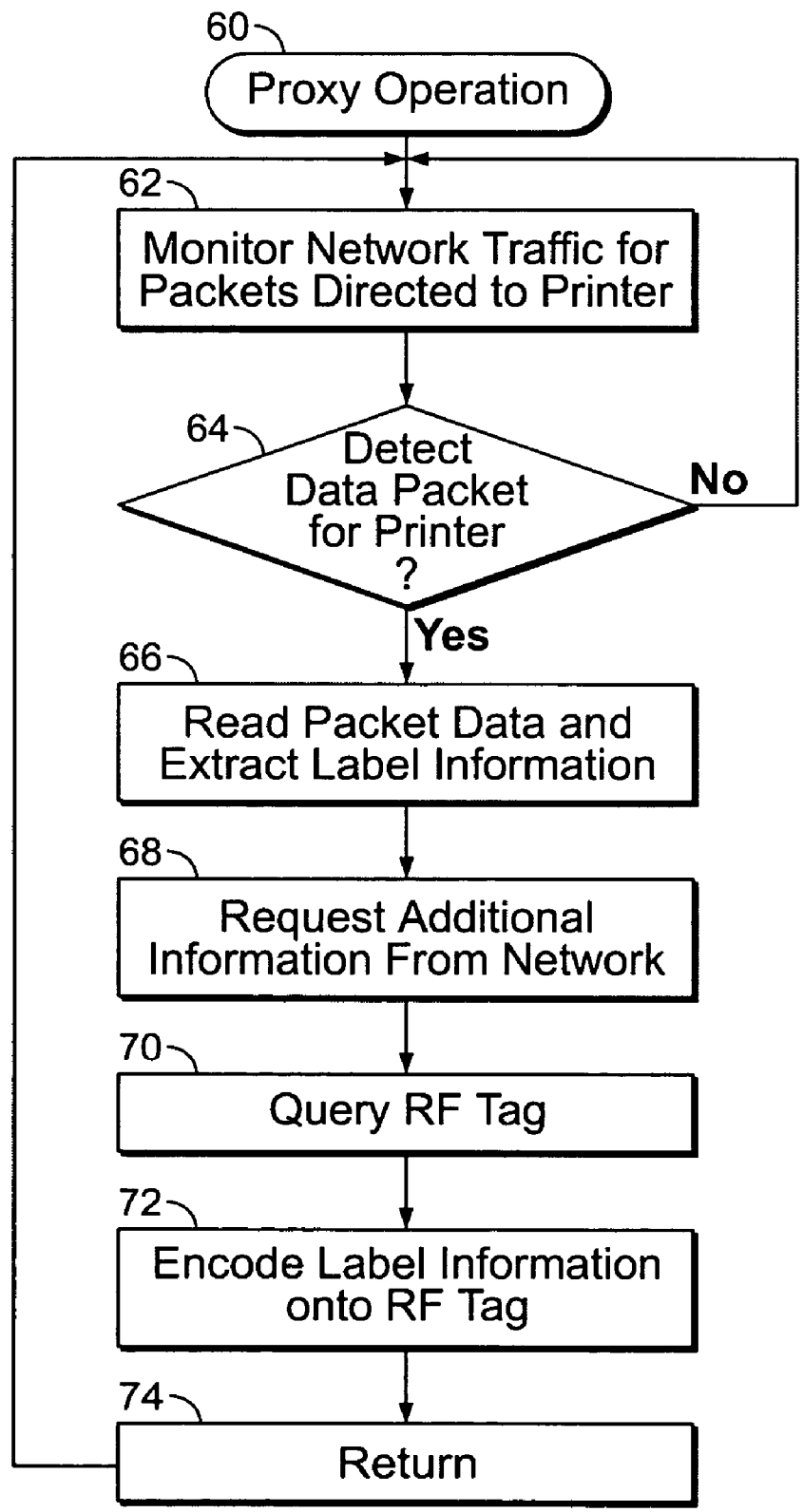
FIG. 4 is a flow diagram illustrating a method of operating the proxy read/write unit in cooperation with a bar code label printer within a local area network.

FIG. 4 illustrates a method 60 of operating the proxy read/write unit 40 in cooperation with a bar code label printer 20 within a LAN. The method 60 would ordinarily be coded in the form of an instruction set (e.g., software or firmware) that is executed by the processor 42 (see FIG. 3). At steps 62 and 64, the processor 42 monitors traffic on the LAN for data packets directed to the printer 20, i.e., having an Ethernet source address corresponding to the printer. Such data packets would carry instructions to the printer 20, including instructions causing the printer to print one or more bar code labels. As discussed above, the data packets would include data fields containing information that would be printed onto the bar code label. If a data packet directed to the printer is identified at step 64, the method passes to step 66. Otherwise, the method continues to loop back through step 62. At step 66, the processor reads the data packet and recovers the information contained in the data fields. This information is then formatted to be written to an associated RFID transponder, in the manner discussed above.

Optionally, the processor 42 may query the LAN at step 68 for additional information to write to the RFID transponder. Since the data capacity of an RFID transponder is much greater than that of a bar code label, it may be desirable to write additional information to the RFID transponder that is not include on the bar code label, and hence not sent by the LAN to the printer 20 in the ordinary course. In that case, the proxy read/write unit 40 communicates a data query to the LAN using the Ethernet address for the printer 20. The LAN responds by communicating a data packet back to the printer 20 containing the additional information. As before, the proxy read/write unit 40 retrieves this data packet, and this additional information is then formatted along with the information contained in the original data packet for writing to the RFID transponder. The printer 20 will also receive the data packet containing the additional information, and discard the data packet because it cannot use the additional information in formatting a bar code label for printing.

At step 70, the processor 42 commands the RFID interrogator 46 to query the RFID transponder. As discussed above, the RFID transponder may be embedded in the label media 30 on which the bar code label is being printed simultaneously. Alternatively, or additionally, the RFID transponder may be separately provided. In either case, if the RFID transponder is within the interrogating field, it responds to the RFID interrogator 46 with an acknowledgement or like signal. Then, at step 72, the processor 42 commands the RFID interrogator to write the formatted data to the RFID transponder. When that step is completed, the method returns to the beginning and the proxy read/write unit 40 is ready to encode another RFID transponder. It should be appreciated that the proxy read/write unit 40 may further be adapted to conduct a subsequent read of the data contained in the RFID transponder to verify that the information was encoded properly.

Having thus described embodiments of a proxy read/write unit to provide a conventional bar code printer with an ability to encode RFID tags embedded in the bar code label print stock, it should be apparent to those skilled in the art that certain advantages of the system have been achieved. It should also be appreciated that various modifications, adaptations, and alternative embodiments thereof may be made within the scope and spirit of the present invention. The invention is further defined by the following claims.

The invention claimed is:

1. A proxy RFID read/write unit for use in a local area network (LAN) including a network server and a network printer coupled together through a network bus, comprising:
   a network interface adapted to be operatively coupled to the network server for receiving and sending message packets to and from said network server;
   an RFID interrogator adapted to read data from and write data to at least one RFID transponder disposed within an interrogating range of said RFID interrogator; and
   a processor operatively coupled to said network interface and said RFID interrogator, said processor having associated memory containing stored instructions executed by said processor, said stored instructions causing said processor to perform the following functions in association with said network interface and said RFID interrogator:
      detecting a message packet directed to said network printer containing a command to print a bar code label;
      recovering information from at least one data field of said message packet; and
      writing said information to an RFID transponder.

2. The proxy RFID read/write unit of claim 1, wherein said network printer is adapted to print onto label media containing embedded RFID transponders, said RFID interrogator being oriented with respect to said network printer so that a mouth of said printer is disposed within said interrogating range.

3. The proxy RFID read/write unit of claim 2, wherein said writing function further comprises writing said information to an RFID transponder embedded in a corresponding print label of said label media.

4. The proxy RFID read/write unit of claim 1, wherein said detecting function further comprises detecting a message packet having an Ethernet address of said network printer.

5. The proxy RFID read/write unit of claim 1, wherein said stored instructions further comprise receiving additional information from said network server separately from said message packet.

6. The proxy RFID read/write unit of claim 5, wherein said writing function further comprises writing said additional information to said RFID transponder.

7. The proxy RFID read/write unit of claim 1, wherein said information includes at least one of product name, serial number, part number, supplier name, supplier address, customer name and customer address.

8. The proxy RFID read/write unit of claim 1, wherein said network interface provides a wireless connection to the network bus.

9. The proxy RFID read/write unit of claim 1, wherein said network interface provides a wired connection to the network bus.

10. A local area network (LAN) comprising:
   a network server;
   a network bus operatively coupled to the network server;
   a printer coupled to said network bus and being responsive to message packets communicated from said network server on said network bus; and
   a proxy RFID read/write unit coupled to said network bus and comprising a network interface, an RFID interrogator and a processor operatively coupled to said network interface and said RFID interrogator, said proxy RFID read/write unit being adapted to detect a message packet directed to said printer containing a command to print a bar code label, said proxy RFID read/write unit recovering information from at least one data field of said message packet, and writing said information to an RFID transponder.

11. The LAN of claim 10, wherein said printer is adapted to print onto label media containing embedded RFID transponders, said proxy RFID read/write unit being oriented with respect to said printer such that said information is written to an embedded RFID transponder in a bar code label being printed.

12. The LAN of claim 10, wherein said proxy RFID read/write unit is further adapted to detect a message packet having an Ethernet address of said printer.

13. The LAN of claim 10, wherein said proxy RFID read/write unit is further adapted to receive additional information from said network server separately from said message packet.

14. The LAN of claim 13, wherein said proxy RFID read/write unit is further adapted to write said additional information to said RFID transponder.

15. The LAN of claim 10, wherein said information includes at least one of product name, serial number, part number, supplier name, supplier address, customer name and customer address.

16. The LAN of claim 10, wherein said network interface provides a wireless connection to the network bus.

17. The LAN of claim 10, wherein said network interface provides a wired connection to the network bus.

* * * * *